United States Patent

Gluck

[11] 3,798,779
[45] Mar. 26, 1974

[54] PROBE INSPECTION SYSTEM
[75] Inventor: David Gluck, Toronto, Ontario, Canada
[73] Assignee: Ferranti-Packard Limited, Toronto, Ontario, Canada
[22] Filed: July 5, 1972
[21] Appl. No.: 269,167

[52] U.S. Cl. ............................ 33/169 C, 33/174 L
[51] Int. Cl. ...................... G01b 11/14, G01b 5/14
[58] Field of Search .......... 33/169 R, 169 B, 169 C, 33/174 R, 174 L, 189, 178 R, 178 E, 172 R, 172 D, 172 E, 191, 185, 174 P, 174 PA

[56] References Cited
UNITED STATES PATENTS

| 2,826,820 | 3/1958 | Zelnick | 33/178 R |
|---|---|---|---|
| 2,994,131 | 8/1961 | Gaylord | 33/169 C |
| 3,094,788 | 6/1963 | Mahlmeister | 33/174 L |
| 3,102,344 | 9/1963 | Herman | 33/174 PA |
| 3,241,243 | 3/1966 | Speer | 33/174 L |
| 3,477,136 | 11/1969 | Johnson | 33/178 R |
| 3,578,746 | 5/1971 | Walker | 33/174 P |

Primary Examiner—John W. Huckert
Assistant Examiner—Jon W. Henry

[57] ABSTRACT

A probe movable along one axis is allowed to adjust to the position of the object detected by measured movement along the other two mutually orthogonal axes.

6 Claims, 5 Drawing Figures

PROBE INSPECTION SYSTEM

This invention relates to locating means whereby the location of an aperture or other shaped portions of a workpiece or other body may be located in up to three dimensions and where such locating may be performed for a multiplicity of such apertures or shaped portions in a single workpiece or body in a nearly simultaneous operation.

In accord with the invention, probes are provided corresponding to each location to be determined, and the probes are designed to be moved toward the workpiece or other body in a predetermined direction. Having regard to this direction, the probe is shaped relative to the thing to be located so that off-centre location of the thing to be located relative to the probe will, within certain predetermined tolerances, when contacted by the probe, exert lateral forces on the probe tending to bring it into predetermined registration with the matter to be located. The probe is mounted relative to a supporting element so that it may slide in two directions at an angle to each other both having components perpendicular to the advancing (predetermined) movement direction and both preferably substantially perpendicular to such direction, whereby measurement of such lateral sliding under the forces applied to the probe, gives a measure of a position of the object exerting such lateral force in two dimensions perpendicular to the designed probe advancement direction. It will be obvious that the amount of probe advancement will give the position of the object in a dimension perpendicular to the first two if this is desired. It will also be obvious that if the object's position in the third dimension is assumed as known, the advance of the probe in the predetermined direction will give another measure such as the diameter of an aperture or the cross-sectional dimensions of a projection.

The shaping of a probe to cause exertion of lateral forces thereon by the object, is best exemplified by what is thought to be the commonest application of the device, where the objects to be located are apertures and the probe is made of conical tapering shape to be tapering in the predetermined advancement direction for the probe and tapering from a diameter larger to a diameter smaller than the aperture.

When the probe, shaped in this way, is advanced sufficiently close to the aperture centre that a tapering side strikes the aperture, its continued advancement causes forces transverse to the advancement direction tending to centre the probe in the aperture. Conversely, a cylindrical projection may be located by a probe having an inner bore tapering away from the probe advancement direction and it will be appreciated that for many objects to be located, a suitable probe shape can be determined to cause the necessary lateral forces.

Means are also provided for inspecting a workpiece having a large number of objects or apertures to be located. In this method the inventive means and method provide a battery or array of probe elements designed or as above described and positionable or arrayed so that all may be moved substantially simultaneously into contact with the objects. The probes are all transversely deflected in two dimensions by the objects and in respective amounts and the measured deflection measured by suitable transducers provided, may be rapidly read for each deflection and each probe. Thus, for example, an auto frame having a large number of apertures, may be rapidly inspected by substantially simultaneous application of a probe for each aperture and providing means for reading the two or three dimensional readings obtainable from each probe. It is found that inspection of auto frames in this way is much more rapid and efficient than by prior methods.

In drawings which illustrate a preferred embodiment of the invention:

Figure 1:
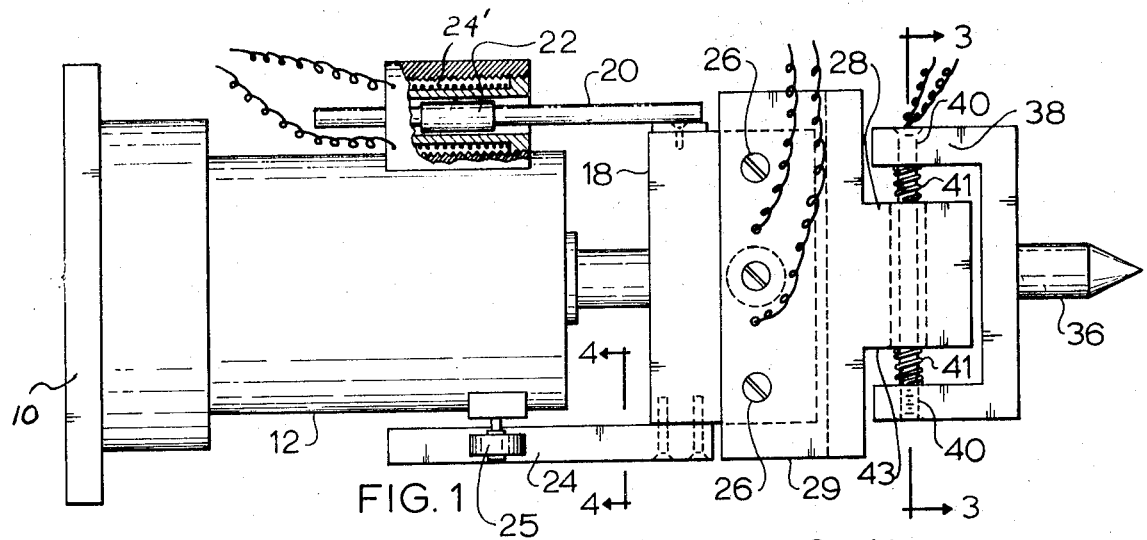
FIG. 1 shows a side view of a probe in accord with the invention.
Figure 2:
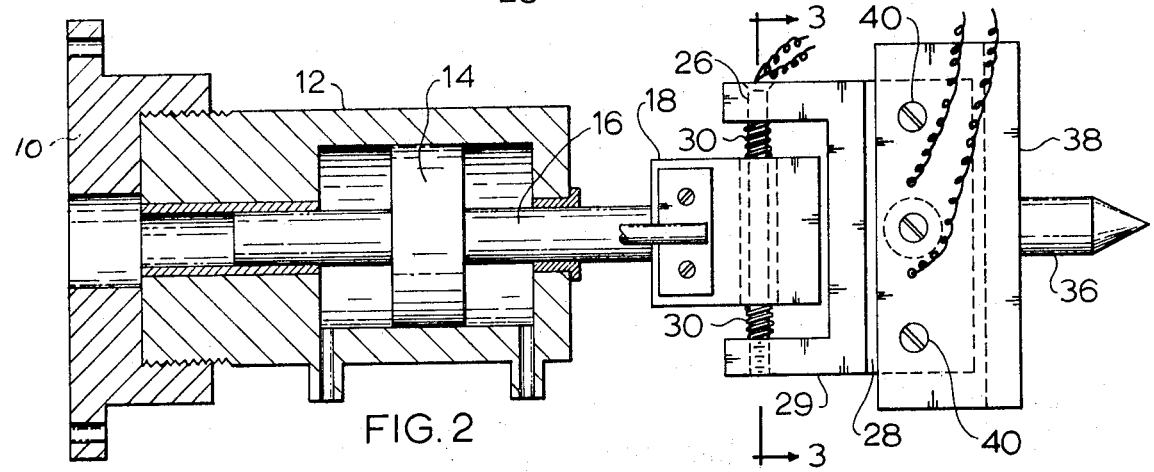
FIG. 2 shows a side view of the probe partially in section in a direction perpendicular to the view of FIG. 1.
Figure 3:
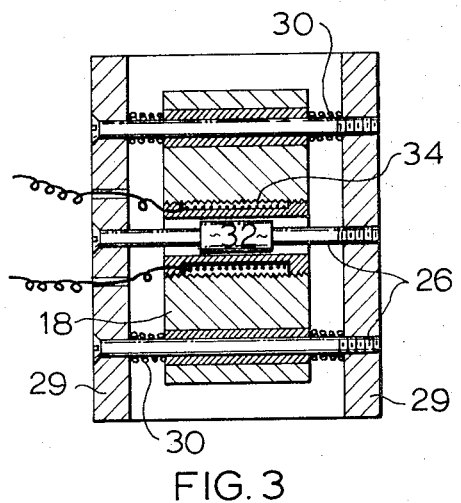
FIG. 3 shows a cross-section along the lines 3—3 of FIG. 2.

In the drawings, a mounting boss 10 mounted on a body to be hereinafter described is provided designed to mount a piston cylinder 12 whose axis and piston 14 and rod 16 are designed to achieve reciprocal movement of the piston 14 and rod 16 in the desired advancement direction for the probe by hydraulic or pneumatic supply means, as shown. The piston mounts mounting element 18 at its end outwardly of the cylinder and this mounting element is provided with a rod 20 projecting parallel to the direction of piston movement and beside the piston cylinder. The rod 20 has mounted thereon a core 22. The cylinder 12 mounts a transducer coil 24' arranged, located and dimensioned to receive the core to varying depth and is connected to sensing means for determining the core displacement and hence the mounting head displacement relative to the cylinder. This type of transducer will be discussed more fully in connection with FIG. 3. It will be appreciated that this method for measuring displacement, shown schematically, may be replaced by any other means; electronic, electric, optical or otherwise for measuring the displacement of the mounting head relative to the cylinder. In many places thereafter such displacement is referred to as the Z axis displacement.

Figure 4:
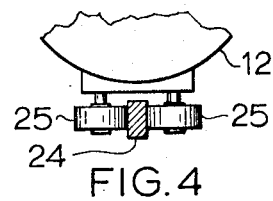
FIG. 4 shows a view along lines 4—4 of the device in FIG. 1.

The mounting head also mounts a rod 24 projecting rearwardly therefrom beside the cylinder 12 to roll (see FIG. 4) between rollers 25 during movement in the predetermined direction and in the reciprocal direction. The rollers 25 guiding the rod 24 prevent rotation of the mounting head 18 relative to the cylinder 12 and protects the transducer and rod. A plurality, here three, of bores are provided through the mounting head 18 substantially perpendicular to the sliding direction of the piston rod, and rods 26 project therethrough to attach at each end to the ears of a coupling member 28 which ears 29 extend over each side of the mounting head 18. The coupling member 28 may therefore slide relative to the mounting head 18 in a direction perpendicular to the extension direction of piston rod 16. Compression springs 30 are provided surrounding each end of each of the outer rods 26 and each bearing at one end on the side walls of member 18 and at the other end on the facing wall of ears 29 of the coupling member and the springs thus acting to bias the coupling member 28 centrally relative to the mounting head 18. The central bore through mounting member 18 is enlarged and the central rod 26 is provided with ferromagnetic core 32 slidable therewith inside a transducer coil 34, schematically shown, which coil is provided with an energizing signal by means, not shown, and connected to means for detecting the change in coil impedance based on movement of transducer core 32 relative to the coil 34. This arrangement is in accord with well known techniques which include rendering from the change of impedance detected, an indication of the relative linear movements of the core and coil. Such a transducer designed to detect impedance change and indicating linear movement, is a production item and I prefer a type MHR Displacement transducer (LUDT) manufactured by Schaevitz Engineering, Pennsanken, N.J. U.S.A. Alternatively, the transducer may be of any form mechanical, electrical, electronic, or optical to give the desired position.

A probe 36 is provided with a pair of ears 38 which are designed to extend on each side of coupling member 28 with the ears 38 transversely disposed relative to the ears on coupling member 28. A plurality (here 3) of rods 40 are mounted to extend between ears 38 to extend through corresponding bores in the coupling member 28 to mount the probe 36 slidably thereon. Compression springs 41 are provided surrounding each end of each of the outer rods 40 and each bearing at one end of the side walls 43 of coupling member 28, and at the other end on the facing walls of ears 38. A transducer similar to that shown in FIG. 3 or of other electrical, electronic, optical or mechanical type is provided to measure the displacement of the probe 36 in the direction defined by the rods 40, i.e., perpendicular to the direction of movement of piston rod 16 and at an angle to the direction coupling member 28 may slide along rods 26.

The invention is applicable to motions of the probe 36 relative to the coupling member and of the coupling member relative to the mounting head, and two motions being at an angle to each other and substantially perpendicular to the piston rod movement. However in practice it will usually be found that these two directions will be mutually perpendicular, so that the displacements in these two directions may be considered as X, Y coordinates and if necessary or desirable the piston rod displacement may be measured and considered as the Z coordinate.

It will be obvious that the directed sliding motion here achieved by rods and bores may equally be achieved through other well known mechanical means of producing accurate sliding movements.

From the nature of the accuracy desired it will be obvious that the sliding connections governing movement of the probe 36 relative to the coupling member 28 and the coupling member relative to the mounting head 18 will be as accurate as possible (and in any event confining 'play' to within allowable measuring tolerances) while allowing easy sliding. Although simple sliding relationships are indicated, it will be obvious that sophisticated roller bearing and other mountings may be used. As previously explained, the probe 36 is tapered relative to the advancement direction and relative to the object to be located, so that the object, if not located in line with the advancing probe will exert lateral stresses on the probe 36 to achieve movement in the two directions of sliding and produce in the transducers, a measure of the device location. In the example given, the objects being located are circular apertures and hence the probe is conically tapered in the advancement direction of the cylinder rod from a diameter larger than the hole to a diameter smaller. (Preferably, and as here indicated, tapered to a point.)

It will be obvious therefore, that as the probe 36 is advanced toward the location of an aperture due to operation of the piston 14 that if the probe point is anywhere within the aperture, then the aperture side edge will exert lateral forces on the probe as the probe continued to advance, such forces eventually acting to center the probe in the aperture. The lateral forces will cause sliding in the X and Y directions which are measured by the transducer. In preferred practice, these transducer measurements are determined by first locating the probe in an aperture correctly located and setting the X, Y and Z transducer readings to zero. The probe is then applied to the test aperture and the difference calibrated in terms of inches or the other relevant units.

It will be obvious from the above that the biasing springs 30 and the biasing springs 41 centering the coupling member 28 relative to the mounting head 18 and the probe 36 relative to the coupling member 28 need not be completely accurate, but must be sufficiently accurate to direct at least the point of the probe 36 into the aperture whose position will be measured.

The advancement of the piston rod 16 relative to the advancement for zero calibration may be used to measure the location of the edges of the aperture and this is the commonest use of readings from the transducer 24. The probe 36 shown is designed for this purpose and has a relatively blunt taper. The probe angle is preferably but not necessarily 52° between diametrically opposed sides of the cone to allow for a correction factor for aperture diametral variations where the error in advance of the cone is equal to the error in aperture measurement. It will be further appreciated that, although this is the less common application of the device, the cone with, preferably, a much more pointed taper may, where the aperture edge location in the Z direction is known, be used to measure the aperture diameter and thus the Z advance, may be calibrated in terms of hole diameter.

Figure 5:
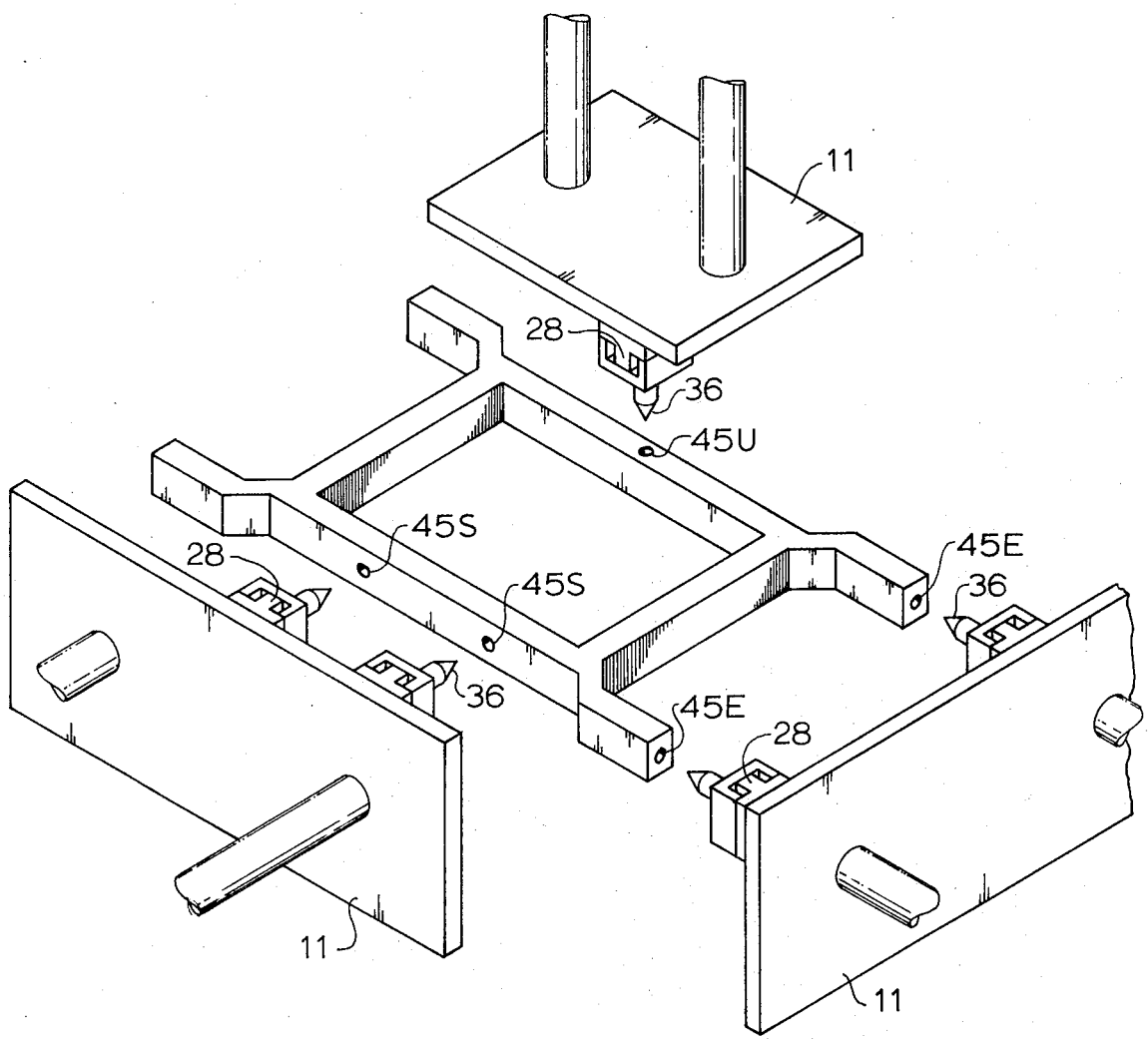
FIG. 5 shows an array of such probes mounted for operation in relation to an automobile frame.

In operation, therefore, the device will be used most commonly on production line machinery, such as where the inspection of apertures 45 shown in FIG. 5 in the automobile frame as schematically indicated. Thus an array of pistons 14 and rods 16 is provided on a plate 11 and corresponds to a plurality of apertures facing in a predetermined direction such as the group represented by aperture 45S of the group represented respectively by groups 45E or 45U. Corresponding plates 11 or other supports may be provided to direct probes 36 mounted as previously described, toward apertures in their respective particular locations and orientations in the frame. In the most common inspection use of the invention, a standard automobile frame wherein the apertures are perfectly located is first properly located relative to the inspection probes and by control machinery the probes (usually in a plurality of arrays and sometimes individually) are all advanced into the apertures 45 in the sample frame. The X, Y and Z transducers are then preferably set to zero (but it could be another predetermined value) and the probes withdrawn. A different frame to be inspected is then located; probes 36 are then advanced as with the standard frame and the transducers are read and in each case give the X, Y, Z readings.

The X and Y readings are a measure of the error in the aperture location. The Z reading (assuming the aperture size, the common situation) indicates the location in the Z dimension of the near edge defining the aperture. In the event that an expected aperture was non-existent or was so badly located that the probe did not encounter it at all, then of course the X and Y readings would be meaningless but the difference in the Z reading would indicate the hole's absence.

As will be readily appreciated, the measurements of any number of probes may be rapidly read by the automatic techniques and the time for inspection of auto frames vastly reduced.

I claim:
1. Locating means comprising:
   an assembly comprising a mounting element, an intermediate coupling member and a probe,
   means supporting said mounting element for movement in a predetermined direction,
   said intermediate coupling member being slidably mounted by a first slidable mounting on said mounting element to extend beyond said mounting element in said predetermined direction,
   said first slidable mounting of said intermediate coupling member on said mounting member being designed to allow relative sliding between said intermediate coupling member and said mounting element in a first transverse direction substantially perpendicular to said predetermined direction,
   said probe being slidably mounted by a second slidable mounting on said intermediate coupling member to extend beyond said intermediate coupling member in said predetermined direction,
   said second slidable mounting of said probe on said intermediate coupling member being designed to allow relative sliding between said intermediate coupling member and said probe in a second transverse direction substantially perpendicular to said predetermined direction and making a substantial angle with said first transverse direction,
   said probe being provided with sides tapering in said predetermined direction,
   said first and said second slidable mountings being so designed that, during movement of said assembly in said predetermined direction, forces exerted on said tapering sides cause movement of said probe in relation to said mounting element due to such sliding movement at said first and second sliding mountings,
   a first transducer comprising a member mounted on said mounting member to move therewith and a cooperating member mounted on said intermediate coupling member to move therewith designed to provide a signal indicative of the relative positions of said mounting member and said intermediate coupling member,
   a second transducer comprising a member mounted on said intermediate coupling member to move therewith and a cooperating member mounted on said probe to move therewith designed to provide a signal indicative of the relative positions of said intermediate coupling member and said probe.

2. Locating means as claimed in claim 1, wherein first biasing means are provided to bias said intermediate coupling members to a position intermediate the limits of movement allowed by said first slidable mounting, said first biasing means being designed to exert such bias in a direction sub-stantially parallel to said first transverse direction; and wherein second biasing means are provided to bias said probe to a position intermediate the limits of movement allowed by said second slidable mounting, said second biasing means being designed to exert such bias in a direction substantially parallel to said second transverse direction.

3. Locating means as claimed in claim 2 wherein said first and second slidable mountings are arranged so that said first and second transverse directions are substantially perpendicular.

4. Means for surveying the location of a plurality of apertures in a workpiece, said means including a plurality of locating means, each comprising:
   an assembly comprising a mounting element, an intermediate coupling member and a probe,
   means supporting said mounting element for movement in a predetermined direction,
   said intermediate coupling member being slidably mounted by a first slidable mounting on said mounting element to extend beyond said mounting element in said predetermined direction,
   said first slidable mounting of said intermediate coupling member on said mounting member being designed to allow relative sliding between said intermediate coupling member and said mounting element in a first transverse direction substantially perpendicular to said predetermined direction,
   said probe being slidably mounted by a second slidable mounting on said intermediate coupling member to extend beyond said intermediate coupling member in said predetermined direction,
   said second slidable mounting of said probe on said intermediate coupling member being designed to allow relative sliding between said intermediate coupling member and said probe in a second transverse direction substantially perpendicular to said predetermined direction and making a substantial angle with said first transverse direction,
   said probe being provided with sides tapering in said predetermined direction,
   said first and said second slidable mountings being so designed that, during movement of said assembly in said predetermined direction, forces exerted on said tapering sides cause movement of said probe in relation to said mounting element due to such sliding movement at said first and second sliding mountings,
   a first transducer comprising a member mounted on said mounting member to move therewith and a cooperating member mounted on said intermediate coupling member to move therewith designed to provide a signal indicative of the relative positions of said mounting member and said intermediate coupling member,
   a second transducer comprising a member mounted on said intermediate coupling member to move therewith and a cooperating member mounted on said probe to move therewith designed to provide a signal indicative of the relative positions of said intermediate coupling member and said probe,
   and including a body fixed to each said means supporting each said mounting element to maintain said plurality of locating means in fixed spaced relation to one another.

5. Means as claimed in claim 4 wherein first biasing means are provided on each assembly to bias the intermediate coupling member thereon to a position intermediate the limits of movement allowed by said first slidable mounting, said first biasing means being designed to exert such bias in a direction substantially parallel to the first transverse direction for said assembly; and wherein second biasing means are provided on each assembly to bias the probe on said assembly to a position intermediate the limits of movement allowed by the corresponding second slidable mounting, said second biasing means being designed to exert such bias in a direction substantially parallel to said second transverse direction.

6. Means as claimed in claim 5 wherein said first and second slidable mountings, in each assembly, are arranged so that said first and second transverse directions are substantially perpendicular.

* * * * *